F. NEUDORFF AND R. R. REID.
STEAM BOILER.
APPLICATION FILED MAY 29, 1919.

1,432,722.

Patented Oct. 17, 1922.
5 SHEETS—SHEET 4.

WITNESSES

F. Neudorff
and R. R. Reid, INVENTORS

BY

ATTORNEY

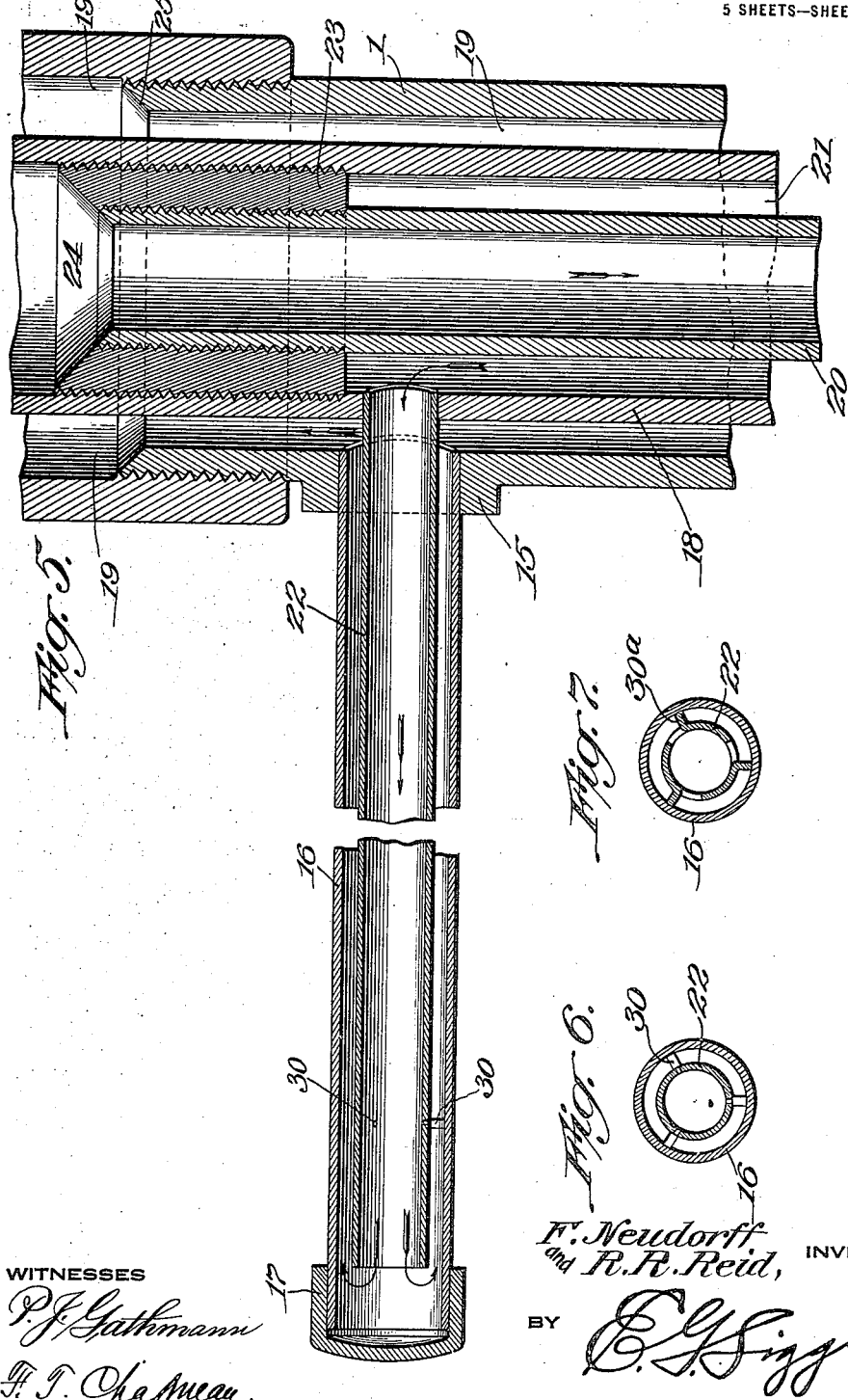

Patented Oct. 17, 1922.

1,432,722

UNITED STATES PATENT OFFICE.

FREDERICK NEUDORFF AND REMER R. REID, OF ATLANTA, GEORGIA.

STEAM BOILER.

Application filed May 29, 1919. Serial No. 300,630.

*To all whom it may concern:*

Be it known that we, FREDERICK NEUDORFF and REMER R. REID, citizens of the United States, residing at Atlanta, in the county of Fulton and State of Georgia, have invented a new and useful Steam Boiler, of which the following is a specification.

This invention has reference to steam boilers, and its object is to provide a water tube boiler which may be constructed in rectangular shape and which is particularly efficient in converting water into steam.

In accordance with the invention, the boiler comprises stand-pipes and headers appropriately grouped and joined together with each stand-pipe rising from a mud drum and terminating in a header and provided with an upright series of steam generating pipes arranged for the presentation of thin streams of water to the effects of heat, and so grouped that the travel of the water and ultimately of steam generated therefrom is progressive, whereby the circulation within the boiler is vigorous. Furthermore, the arrangement is such that free water is not carried into the steam drum and any foreign matter which may be in the water is directed to the mud drum or drums.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 5 is a section through a portion of one of the stand pipes and one of the steam generators connected therewith.

Figure 6 is a cross section of a steam generator pipe showing spacing pins.

Figure 7 is a similar section showing spacing tangs instead of pins.

Figure 1:
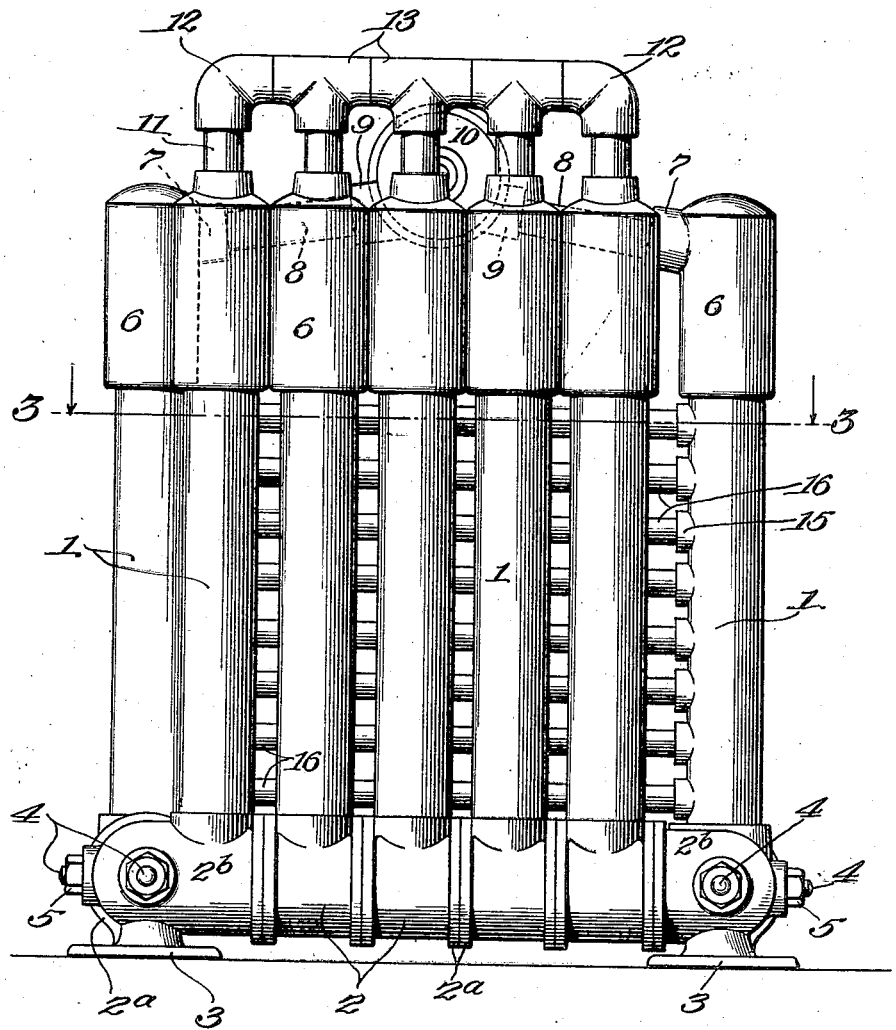
Figure 1 is a front elevation of a boiler

Referring to the drawings, there is shown a boiler made up of series of stand-pipes 1 erected on mud drums 2 with each mud drum supported by bases 3. In the particular arrangement of boiler shown in the drawings, the stand-pipes 1 are assembled in four groups with the stand-pipes of each group close together and the four groups forming a rectangle. The mud drums 2 are each composed of a series of couplings $2^a$ abutted end to end, and extending lengthwise through each mud drum is a rod 4 projecting through and beyond the terminal couplings $2^b$, said terminal couplings being branches of L's at each of the four corners of the mud drum, such particular formation being due to the four-square arrangement of the boiler. Each rod 4 has nuts 5 at the outer ends whereby the mud drums and parts making up the same are secured together.

Figure 2:
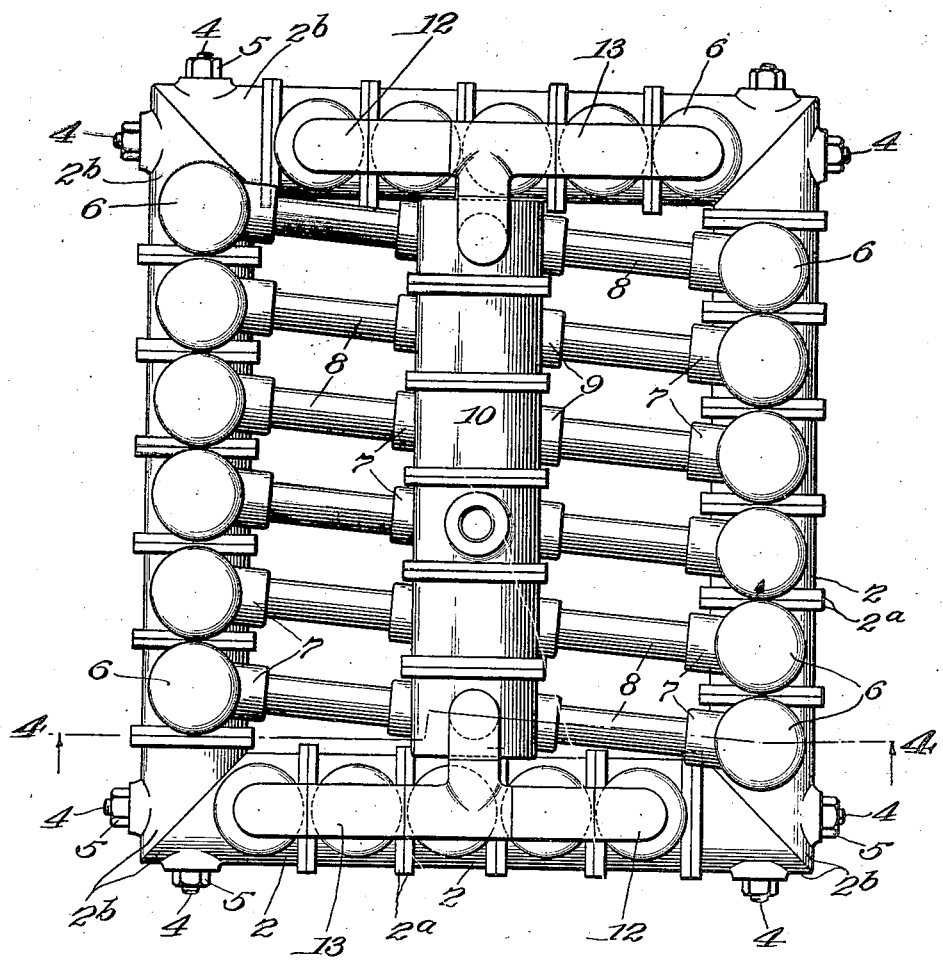
Figure 3:
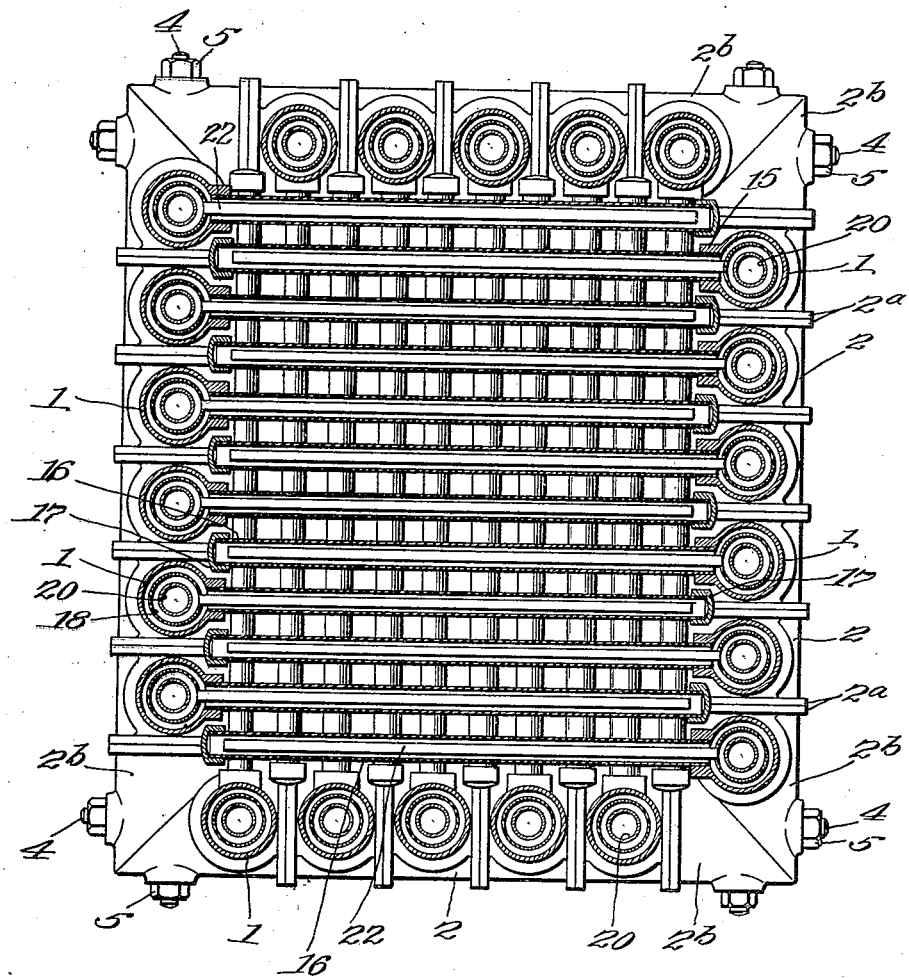
Figure 4:
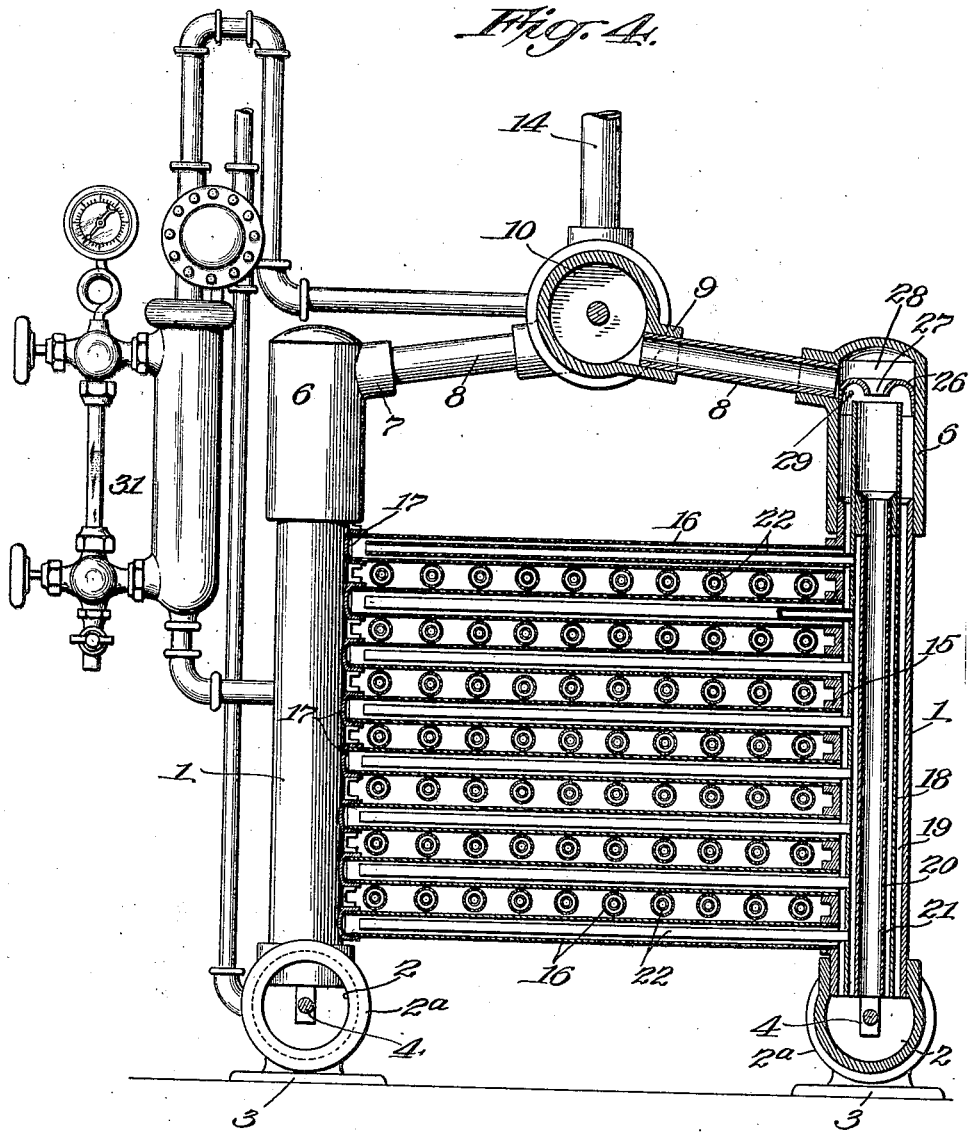

The stand-pipes are one greater in number than the number of couplings $2^a$ and are equally spaced, while one end coupling $2^b$ of each mud drum is longer than the other, as shown in Fig. 2. The stand-pipes are alternately arranged on opposite sides of the boiler with one stand-pipe connected with each coupling $2^a$ and one connected with the longer end coupling $2^b$.

Each stand-pipe terminates in a header 6 elongated in the direction of the length of the stand-pipe and into which header the stand-pipe is screwed or otherwise secured. Each header on two opposite sides of the boiler has a boss 7 directed toward the midthe first-named lateral pipes and extending through the first-named lateral pipes to near the closed ends thereof, a third pipe within the upright pipe aforesaid and defining therewith a space closed at the upper end, a mud drum with which the stand-pipe and the pipes within the stand-pipe communicate, and a header carried by the stand-pipe and with which the stand-pipe and the inner pipe within the stand pipe communicate.

7. A steam boiler provided with stand-pipes each having a series of lateral pipes projecting therefrom with each lateral pipe closed at the outer end, an upright pipe within the stand-pipe spaced from the inner wall thereof, a third pipe within the upright pipe aforesaid and defining therewith a space closed at the upper end, a mud drum with which the stand-pipe and the pipes within the stand-pipe communicate, a header carried by the stand-pipe and with which the stand-pipe and the inner pipe within the stand-pipe communicate, and a deflector within the header with a passage therethrough for steam and shaped to divert water to the mud drum.

8. A steam boiler provided with stand-pipes each having a series of lateral pipes projecting therefrom with each lateral pipe closed at the outer end, an upright pipe within the stand-pipe spaced from the inner wall thereof and provided with a series of lateral pipes corresponding in number to the first-named lateral pipes and extending through the first-named lateral pipes to near the closed ends thereof, a third pipe within the upright pipe aforesaid and defining therewith a space closed at the upper end, a mud drum with which the stand-pipe and the pipes within the stand-pipe communicate, a header carried by the stand-pipe and with which the stand-pipe and the inner one within the stand-pipe communicate, and a deflector within the header with a passage therethrough for steam and shaped to divert water and foreign matter carried thereby to the mud drum.

9. A steam boiler comprising a base portion formed of a plurality of mud drums joined together at their ends, groups of stand-pipes rising from the mud drums and defining the marginal portions of the boiler, headers carried by the stand-pipes, a steam drum communicating with each header, a deflector in each header above the stand-pipe, two concentric pipes within each stand-pipe with the other one of the concentric pipes spaced from the stand-pipe and the inner and outer pipes joined at the upper ends to provide a space closed at the upper end with the outer one of the joined pipes terminating close beneath the deflector, and a series of steam generating pipes carried by each stand-pipe.

10. A steam boiler comprising a base portion formed of a plurality of mud drums joined together at their ends, groups of stand-pipes rising from the mud drums and defining the marginal portions of the boiler, headers carried by the stand-pipes, a steam drum communicating with each header, a deflector in each header above the stand-pipe, two concentric pipes within each stand-pipe with the other one of the concentric pipes spaced from the stand-pipe and the inner and outer pipes joined at the upper ends to provide a space closed at the upper end with the outer one of the joined pipes terminating close beneath the deflector, and a series of steam generating pipes carried by each stand pipe with each steam generating pipe composed of an outer and an inner pipe, said outer pipe extending from the stand-pipe and closed at the outer end, and the inner pipe extending from the outer one of the two pipes within the stand-pipe and terminating near to the closed end of the outer pipe of the steam generating pipe.

11. A steam boiler comprising a plurality of mud drums, each mud drum being composed of a series of couplings, a group of stand pipes connected with and rising from each mud drum, there being one stand pipe for each of the couplings of each mud drum except one of the end couplings, all the mud drums opening into each other at their ends so that the plurality of mud drums forms effectually a single continuous or endless drum, and steam generating pipes carried by each stand pipe, and projecting transversely in alternate relation from opposite sides of the boiler and having closed ends located between oppositely-disposed stand-pipes.

12. In a steam boiler, a plurality of mud drums arranged in substantially rectangular conformation, each drum being composed of a series of intermediate couplings and end couplings of different lengths, the corresponding end couplings of opposite drums being of different lengths, the end couplings of adjacent drums being connected, stand pipes connected to each intermediate coupling and the longer ones of the end couplings, a down-flow pipe concentrically arranged in each stand pipe, and steam generating tubes projecting in alternate relation from the stand pipes on opposite sides of the boiler.

13. A steam boiler comprising a plurality of mud drums joined at their ends, each mud drum being composed of a series of couplings, a group of stand-pipes connected with and rising from each mud drum, there being one stand-pipe for each of the couplings of each mud drum except one of the end couplings, the stand-pipes of opposite groups being staggered, and tubes carried by each stand-pipe in inwardly-projecting relation to the boiler, and forming horizontal layers or tubes, alternate layers of which being transversely disposed to the other layers.

14. A steam boiler comprising a plurality of mud drums, a group of stand-pipes rising from each mud drum, a header connected to the upper end of each stand-pipe, and a steam drum, some of the headers being grouped by fittings corresponding to the grouping of the stand pipes and connected as a group with the steam drum, others of the headers being directly and individually connected with the steam drum, and steam generating tubes carried by the stand pipes in staggered relation and in alternate layers from opposite sides of the boiler.

In testimony, that we claim the foregoing as our own, we have hereto affixed our signatures.

FREDERICK NEUDORFF.
REMER R. REID.

Witnesses:
F. W. HOLT, Jr.,
A. H. McDONALD.

R. T. NEWTON.
AUTOMOBILE BUMPER.
APPLICATION FILED JUNE 7, 1921.
1,432,723.
Patented Oct. 17, 1922.
3 SHEETS—SHEET 1
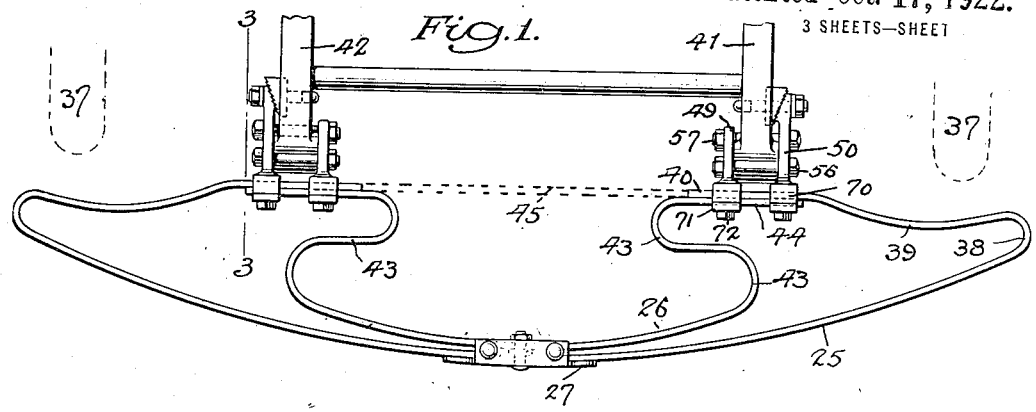
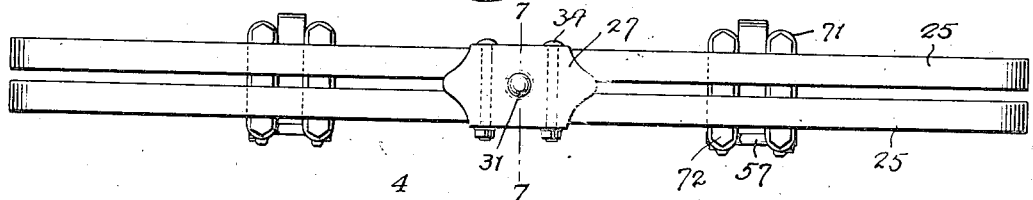
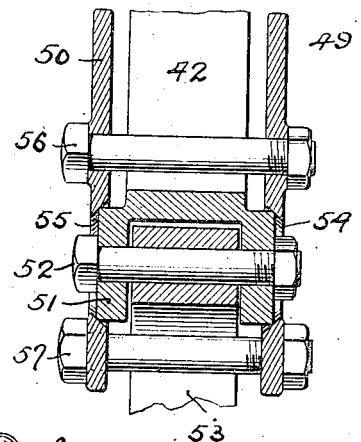
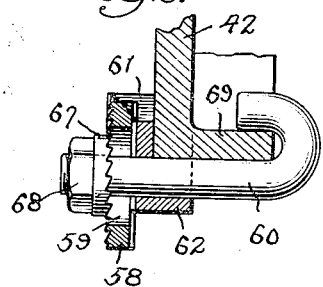
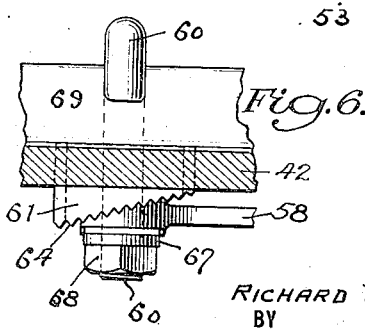
INVENTOR
RICHARD T. NEWTON
BY
ATTORNEYS